Figure 1:
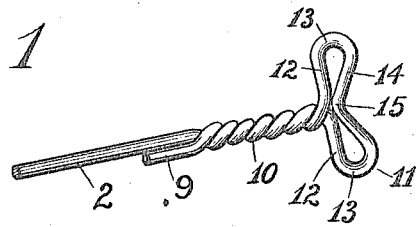
Figure 1:
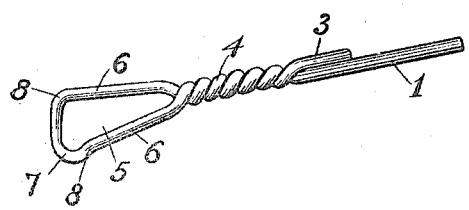

J. A. GABRIEL.
BALE TIE.
APPLICATION FILED DEC. 23, 1915.

1,263,547.

Patented Apr. 23, 1918.

Inventor
J. A. Gabriel
By
his Attorney

UNITED STATES PATENT OFFICE.

JOSEPH A. GABRIEL, OF LAKEWOOD, OHIO.

BALE-TIE.

1,263,547. Specification of Letters Patent. Patented Apr. 23, 1918.

Application filed December 23, 1915. Serial No. 68,319.

*To all whom it may concern:*

Be it known that I, JOSEPH A. GABRIEL, a citizen of the United States, residing at Lakewood, in the county of Cuyahoga and State of Ohio, have invented certain new and useful Improvements in Bale-Ties, of which the following is a specification.

This invention relates to bale ties such as are constructed of wire and employed for fastening around bales of hay and straw, bundles of paper and the like.

The principal objects of the invention are—to provide a bale tie that is inexpensive to manufacture, and on account of its particular form, is not only easy to tie but also has great resisting strength so that the head will not pull out under strain.

With the above and other objects in view as will be readily understood, the invention will be hereinafter fully described in connection with the accompanying drawings, which simply illustrate a preferred form of the same, and the novel features of the invention will be distinctly pointed out in the appended claims.

In the drawings like characters of reference indicate corresponding parts.

Figure 2:
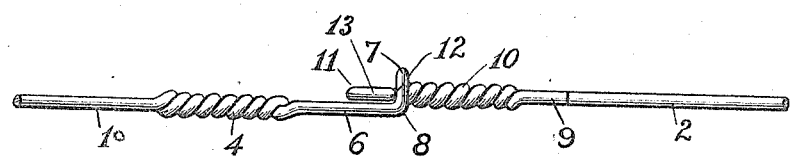
Figure 3:
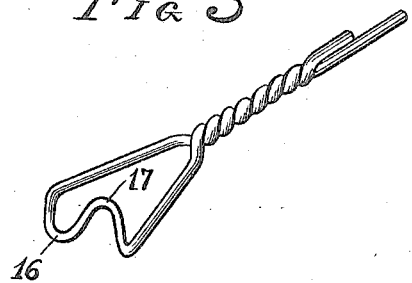

Figure 1 is a perspective view of the opposite ends of a bale tie constructed in accordance with my invention, the middle portion being omitted, Fig. 2 is a side elevation showing the ends of the bale tie in locked position, and Fig. 3 is a perspective view illustrating a modification of the eye end of the bale tie.

Referring to the drawings, 1 represents the eye end and 2 the opposite or T head end of a bale tie constructed from a single piece of suitable wire. The free end 3 of said eye end is twisted around the wire 1, at 4, to form a loop or eye 5. This eye consists of diverging sides 6, and a rounding end portion 7, which is bent at 8 to a right angle with the plane of the eye. The other free end 9 of the bale tie is twisted around the wire 2, at 10, for forming a T head 11, which is adapted to enter the eye 5 and lockingly engage its bent up end portion 7. Said T head comprises oppositely extending arms 12, inwardly turned ends 13, and inclined braces 14, which lie back of and in the same plane as said arms. The connected ends 15 of said braces bear against the juncture of the arms 12, and therefore these braces give great resisting strength to the arms, so that they will not bend backwardly under strain.

In applying the tie to a bale, the eye is arranged with its bent up portion extending upwardly and the T head is inserted through the eye by turning it to the proper position, and when the pressure employed to compress the bale preparatory to tying is released, the arms of the T head will engage the bent up portion of the eye and thus will the ends of the tie be securely fastened. It will be noted that, the rounding bent up portion of the eye is of sufficient size to accommodate the twisted part of the T head end of the tie.

In the modification illustrated in Fig. 3, the eye end of the tie is made with two oppositely bent up end portions 16 and 17. When applying the tie, the eye end may lie with either bent up portion standing upwardly and the T head will engage the same. This avoids the necessity of being compelled to arrange the eye in but one position, and is an advantage in that time in tying is saved.

It will be understood that slight changes in the details of construction may be made in carrying out the spirit of the invention.

Having fully described my invention, what I claim is:

1. A wire bale tie comprising an eye end, a T head at the other end of the tie adapted to engage the eye end, the T head having oppositely extending arms, and means for bracing the arms, substantially as described.

2. A wire bale tie comprising an eye end, a T head at the other end of the tie adapted to engage the eye end, the T head having oppositely extending arms, the ends of the arms being bent inwardly, and said bent in ends forming braces for the arms, substantially as described.

3. A wire bale tie comprising a T head at one end thereof, the T head having oppositely extending arms, the ends of the arms being bent inwardly, said bent in ends forming braces, the braces being in spaced relation to the arms and in the same plane therewith, the braces being connected together, the connected ends of the braces bearing against the juncture of said arms, and means at the other end of the tie adapted to be engaged by the arms of the T head, substantially as described.

In testimony whereof I affix my signature.

JOSEPH A. GABRIEL.

Copies of this patent may be obtained for five cents each, by addressing the "Commissioner of Patents, Washington, D. C."